United States Patent [19]
Erickson et al.

[11] Patent Number: 5,695,237
[45] Date of Patent: Dec. 9, 1997

[54] VISOR AND METHOD OF MANUFACTURE

[75] Inventors: Brian L. Erickson; Patrick W. Binish; Kermit M. Anderson, all of Holland, Mich.

[73] Assignee: Pince Corporation, Holland, Mich.

[21] Appl. No.: 631,569

[22] Filed: Apr. 12, 1996

[51] Int. Cl.[6] .................................................. B60J 3/00
[52] U.S. Cl. ............................................... 296/97.1
[58] Field of Search ....................................... 296/97.1

[56] References Cited

U.S. PATENT DOCUMENTS

| | | | |
|---|---|---|---|
| 3,916,051 | 10/1975 | Wakeman | 428/40 |
| 4,570,990 | 2/1986 | Flowerday. | |
| 5,007,532 | 4/1991 | Binish. | |
| 5,205,635 | 4/1993 | Van Order et al.. | |
| 5,364,188 | 11/1994 | Godfried et al. | 383/4 |

*Primary Examiner*—Gary C. Hoge
*Attorney, Agent, or Firm*—Price, Heneveld, Cooper, DeWitt & Litton

[57] ABSTRACT

A visor comprises a fiberboard butterfly-shaped core having a first or inner surface coated with a co-adhesive and has its opposite surface covered with a suitable upholstery material having an edge which extends over the periphery of the butterfly core. The core is folded over a pivot rod and torque control such that the facing adhesive surfaces adhesively engage one another to complete the visor construction. The methods of manufacturing the visor includes the steps of applying a co-adhesive to sheets of fiberboard and cutting the sheets into the butterfly shape of a desired visor configuration. The individual butterfly sheets are stacked on one another with the adhesive layers facing in the same direction, such that the adjacent butterfly cores do not adhere to one another. Subsequently, the single core members are placed on butterfly-shaped upholstery having a slightly larger dimension than that of the core. The upholstery edges are folded over the edges of the core, and a pivot rod and torque control member is positioned near the fold line of the butterfly core which defines the upper edge of the visor when completed. The halves of the butterfly core are folded and pressed together to complete the visor construction.

16 Claims, 2 Drawing Sheets

VISOR AND METHOD OF MANUFACTURE

BACKGROUND OF THE INVENTION

The present invention relates to a vehicle visor and particularly one which is of a butterfly core construction, the halves of which are folded over and held together by a cold-seal adhesive.

Typically visors are manufactured having either a butterfly-shaped molded polymeric core, such as one made of a polypropylene as described in U.S. Pat. No. 4,570,990. Fiberboard construction has also been used with the butterfly core halves held together with an adhesive, such as a urethane material, as disclosed in U.S. Pat. No. 5,007,532. More recently, fiberboard butterfly-type visor cores have been held together utilizing an adhesive which requires the core halves to be placed in a press for a predetermined amount of time to allow the adhesive to cure. This increases the manufacturing time and, therefore, cost of the visor construction. Although contact adhesives have also been employed for such purpose, the utilization of a contact adhesive makes it difficult to handle preformed butterfly core halves inasmuch as objects which come into contact with the adhesive surface adheres thereto, preventing, inter alia, the stacking of visor core shapes during the manufacturing process.

SUMMARY OF THE PRESENT INVENTION

The visor of the present invention utilizes the beneficial construction provided by a butterfly fiberboard core visor construction which is relatively inexpensive and improves the manufacturing process for such visor construction by providing an adhesive which sticks only to itself thereby allowing sheets of preformed visor cores to be stacked for use in a manufacturing process since only the facing coated core halves will adhere to themselves. In a preferred embodiment of the invention, a visor comprises a fiberboard butterfly-shaped core having a first or inner surface coated with a cold-seal adhesive or co-adhesive and has its opposite surface covered with a suitable upholstery material. The core is folded over a pivot rod and torque control such that the facing co-adhesive coated surfaces bond to one another to complete the visor construction.

Methods of manufacturing the visor of the present invention include the steps of applying a cold-seal adhesive to sheets of fiberboard, cutting the sheets into generally rectangular blanks from which a subsequent die cutting step cuts the blanks into the butterfly shape of a desired visor configuration. The individual butterfly sheets are stacked on one another with the adhesive layers facing in the same direction, such that the adjacent butterfly cores do not adhere to one another. Subsequently, single core members are placed on top of the inside surface of a butterfly-shaped fabric having a slightly larger dimension than that of the core. A pivot rod torque control member is positioned adjacent the fold line of the butterfly core which defines the upper edge of the visor when completed. Halves of the butterfly core are folded and pressed together while the edges of the upholstery are folded over the peripheral edge of the butterfly cores, with the foam layer of the upholstery material adhering to the cold-seal adhesive to complete the visor construction. The cold-seal adhesive permanently holds the visor core halves together.

With such a visor and process of manufacturing, therefore, a relatively inexpensive fiberboard core construction visor can be provided utilizing a co-adhesive which assures that the upholstery covering of the visor remains securely in place and the visor core halves securely bonded to hold the torque control and pivot rod therein. This manufacturing process eliminates the otherwise necessary press time for curing of conventional adhesives. The utilization of a cold-seal adhesive or co-adhesive also eliminates the difficulties in handling visor cores which employ a contact-type adhesive. These and other features, objects and advantages of the present invention will become apparent upon reading the following description thereof together with reference to the accompanying drawings.

DETAILED DESCRIPTION OF THE PREFERRED EMBODIMENT

Figure 1:
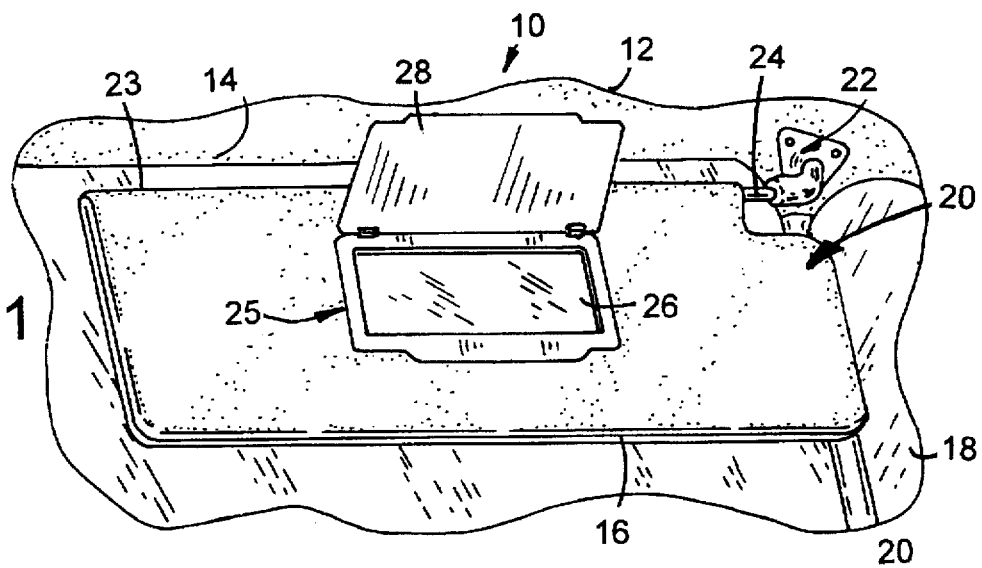
FIG. 1 is a perspective view showing a visor embodying the present invention mounted in a vehicle.
Figure 3:
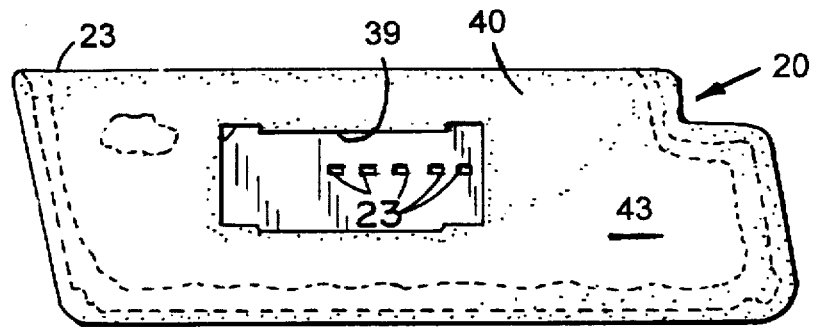
FIG. 3 is an elevational view of the visor of FIG. 2 shown in a closed position.

Referring initially to FIG. 1, there is shown a visor 20 mounted in a vehicle 10, such as an automobile, having a roof 12 covered by a preformed headliner 14 positioned above the front windshield 16 and the passenger side window 18. The visor 20 embodying the present invention is shown mounted to the sheet metal roof of the vehicle 10 utilizing a visor control 22 which includes an elbow bracket. Control 22 includes a pivot rod 24 which extends within the core of the visor 20 as described below to allow the visor to pivot from a raised stored position adjacent the vehicle headliner 14 to a lowered use position, as illustrated in FIG. 3. Visor 20 also includes a covered vanity mirror assembly 25 mounted to the visor core and including a mirror 26 and cover 28 for selectively covering the mirror. In some embodiments, the mirror assembly 25 may also include illumination means for the selective illumination of the mirror for use in low ambient light conditions.

Figure 2:
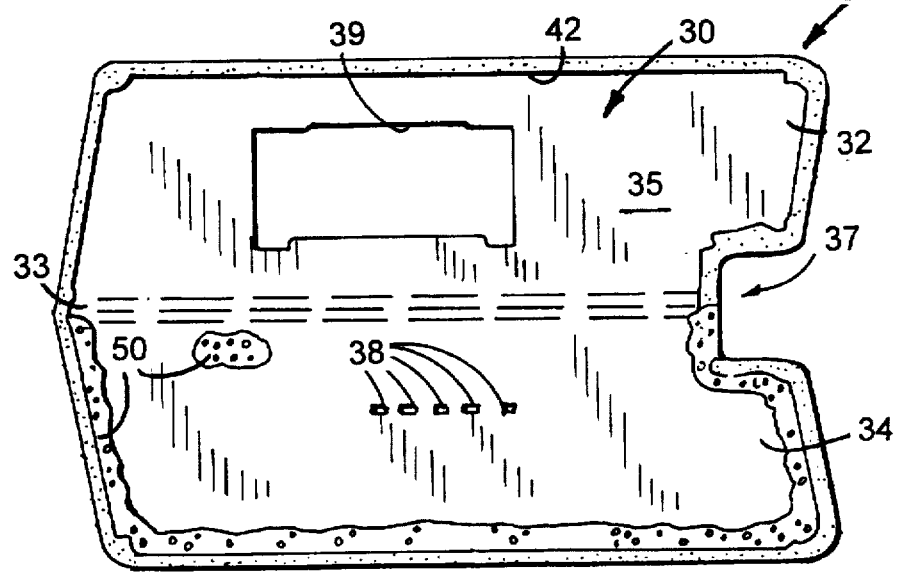
FIG. 2 is a front elevational view of the visor of FIG. 1 prior to its assembly and showing the butterfly core, the decorative fabric and the adhesive in place on the inner surface of the core.

Referring now to FIGS. 2 and 3, the construction of visor 20 is illustrated in greater detail. The visor 20 comprises a butterfly-shaped core 30 having a first half 32 and an integral second half 34 which is of mirror image shape to half 32 and which is integrally joined thereto by a fold line 33. Fold line 33 extends generally along the longitudinal axis of the visor so-formed defining the upper edge 23 of the visor when completed as seen in FIGS. 1 and 3. The visor core 30 is covered by an upholstery material 40 cut in the same shape as the butterfly core 30 only slightly larger, such that a peripheral edge 42 of the upholstery material is extended over the peripheral edge of the core 30, as seen in FIG. 2, during final assembly of the visor. The substantially flat core 30 is made of fiberboard having a thickness of approximately 0.040 inches. The inner surface 35 (FIG. 2) of each of the core halves 32, 34 is coated with a cold-seal adhesive 50 prior to the placing of the upholstery material 40 thereon and the wrapping of a peripheral edge 42 of the upholstery around the periphery of the open butterfly core during the final assembly. FIG. 2 shows the visor core and placement of the upholstery material only for purposes of illustrating the relationship of these elements. It being understood that the upholstery is applied to the core only during final assembly. The upholstery material 40 is conventional, having either a fabric or vinyl outer surface 43 and a foam backing of open cell polyether urethane. The cold-seal adhesive is illustrated as 50 in FIGS. 2 and 3, with it being understood that the entire inner surface 35 of the core 30 is covered by the adhesive.

The adhesive 50 has the unique property of being dry and non-sticky to the touch when applied and dried onto the surface 35 of the cores. It does not stick to other objects although the foam backing of the upholstery material 40 tends to adhere to adhesive 50 during the tucking of the upholstery material as the core is folded. It is believed this occurs in part due to electrostatic attraction. The adhesive is a water-based emulsion which is commercially available from Findley Adhesives, Inc. of Wauwatosa, Wis., Product No. 2122-939 and sold under the trademark NIP-WELD. Other similar cold-seal adhesives also could be employed provided they demonstrate the characteristics of adhering only to similarly coated objects. This adhesive is defined herein as a co-adhesive since it adheres only to itself.

The visor control 22 is positioned along the fold line 33 of the open butterfly core near the open end area 37 and includes a torque device of the type disclosed in U.S. Pat. No. 5,205,635, which has teeth extending within slots 38 formed in core half 34 for holding the torque device in place within the visor body once the core halves are folded over, as shown in FIG. 3. Core half 32 includes a generally rectangular aperture 39 for receiving therein the illuminated or non-illuminated covered vanity mirror package 25 which can snap-fit onto the edges of the rectangular aperture 39. The substantially flat core halves 32, 34 are folded together such that the co-adhesive 50 on the facing surfaces bond and hold the visor so formed together. The application of the co-adhesive and the manufacturing method for the visor is now described in greater detail.

Figure 4:
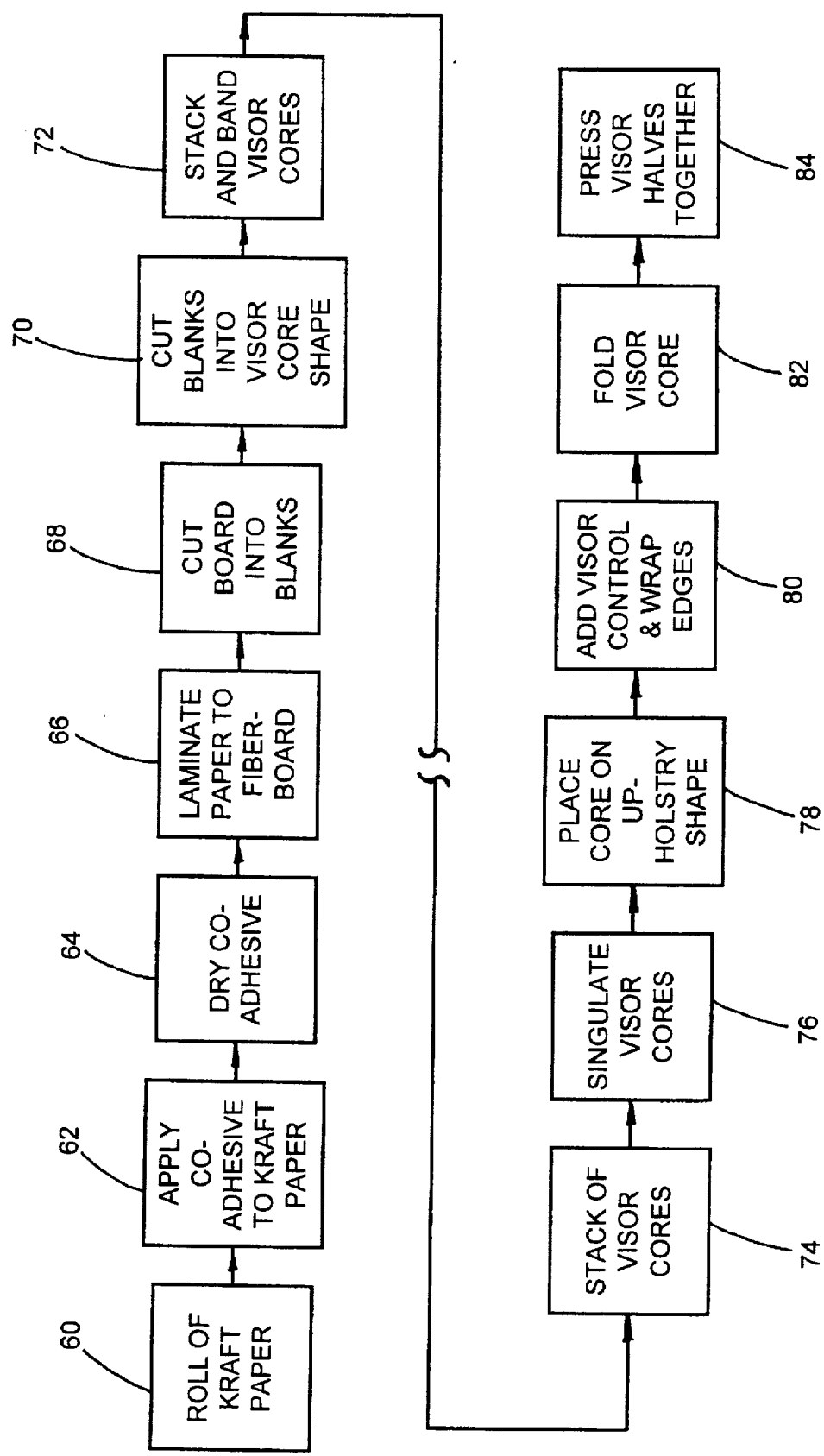
FIG. 4 is a flow diagram of the process of manufacturing the visor of the present invention.

The process for manufacturing the visor 20 of the present invention, as seen in FIG. 4, can be an interrupted manufacturing process which allows for the preforming of the butterfly-shaped core members and the co-adhesive applied and, subsequently, the completion of the manufacturing of the visor assembly. During the premanufacturing of the core members 30, a continuous roll of kraft paper 60 is coated, as indicated by block 62, with the co-adhesive using roll coating in a conventional manner. The liquid adhesive adheres to the kraft paper which has a thickness of approximately 0.005 inches and is cured by a conventional convection heating process in an oven, as indicated by block (64. The kraft paper is then bonded to sheets of fiberboard stock, as indicated by block 66. A conventional starch-based adhesive is employed to bond the kraft paper to the fiberboard. The now laminated fiberboard sheets having the co-adhesive upper surface is cut, as indicated by block 68, into generally square or rectangular shapes of sufficient size and dimensions from which to form the butterfly core shapes of a particular visor, such as that shown in FIG. 2. The final butterfly shape of the visor is die cut, as indicated by block 70, and the now preformed, adhesively coated butterfly core halves can be stacked and banded, as indicated by block 72, for utilization in the subsequent completion of the visor manufacturing process. This premanufacturing of core shapes may conveniently be accomplished at a facility other than the final assembly location such that an inventory of relatively inexpensive different shaped core halves can be available for just-in-time final assembly of different visor models. The manufacturing, however, can also be accomplished as a continuous process.

For final assembly, the supply of stacked butterfly cores 74 with the co-adhesive layer 50 facing upwardly are singulated, as indicated by block 76, and placed on top of a precut butterfly-shaped fabric covering for the visor with the urethane backing of the fabric coming into contact with the non-adhesive side of the butterfly core shape (block 78). Subsequently, as indicated by block 80, the visor control 22 is positioned in the core and the upholstery folded over the peripheral edges of the core using tucking fingers in a conventional manner. Next, as indicated by step 82, the visor core halves are folded and pressed together and pressure momentarily applied, as indicated by block 84, to complete the visor construction. If a mirror assembly 25 is to be included, the cutting step 72 will include die cutting aperture 39 in one of the core halves and the final visor construction is completed by snap-fitting the mirror package 25 into the visor.

With the visor construction of the present invention, therefore, a relatively inexpensive flat, light-weight visor construction is achieved utilizing a co-adhesive which provides firm bonding of the visor core halves together and allows easy handling of preformed visor core shapes for subsequent assembly. It will become apparent to those skilled in the art that various modifications to the preferred embodiment of the invention as described herein can be made without departing from the spirit or scope of the invention as defined by the appended claims.

The embodiments of the invention in which an exclusive property or privilege is claimed are defined as follows:

1. A vehicle visor comprising:
    a substantially thin visor core having a fold line and shaped to be folded along said fold line into the shape of a visor body, said core having a first surface coated over substantially the entire first surface with a co-adhesive material and an opposite surface covered by an upholstery material; and
    a pivot rod assembly extending along the fold line of the first surface of said core such that when said core is folded, facing portions of said first surface adhere to one another and secure the pivot rod assembly and upholstery therein.

2. The visor as defined in claim 1 wherein said core is butterfly-shaped.

3. The visor as defined in claim 2 wherein said core is made of fiberboard.

4. The visor as defined in claim 3 wherein said co-adhesive material comprises a cold-seal adhesive.

5. The visor as defined in claim 4 wherein said cold-seal adhesive is a water soluble adhesive.

6. A method of manufacturing a visor comprising the steps of:
    applying a co-adhesive material to substantially an entire first surface of a core for a visor;
    placing an upholstery material on an opposite surface of said core;
    placing a visor control on the core along a fold line thereof; and
    folding the core along the fold line to adhere opposite sides of the first surface of the core together to complete a visor body.

7. The method as defined in claim 6 and further including the steps of forming the core by laminating kraft paper onto fiberboard.

8. A vehicle visor comprising:
    a butterfly-shaped fiberboard core having first and second opposed surfaces;
    a co-adhesive material applied to substantially the entire said first surface of said core;

an upholstery material applied to said second surface of said core; and a pivot rod assembly extending along a fold line of said core such that when said core is folded, portions of said first surface adhere to one another and secure the pivot rod assembly and upholstery therein.

9. The visor as defined in claim 8 and further including a mirror mounted to said core.

10. The visor as defined in claim 8 wherein said co-adhesive material comprises a cold-seal adhesive.

11. The visor as defined in claim 10 wherein said cold-seal adhesive is a water soluble adhesive.

12. A vehicle visor comprising:

a planar sheet of material shaped to define a visor core when folded along a centerline, said core having a first surface entirely coated with an adhesive material which adheres only to itself and an opposite surface covered by an upholstery material; and a visor control extending along the center line of the first surface of said core such that when said core is folded, said first surface adheres to itself and secures visor control and upholstery to said core.

13. The visor as defined in claim 12 wherein said core is butterfly-shaped.

14. The visor as defined in claim 13 wherein said core is made of fiberboard.

15. The visor as defined in claim 14 wherein said adhesive material comprises a co-adhesive.

16. The visor as defined in claim 15 wherein said co-adhesive is a water soluble cold-seal adhesive.

* * * * *

UNITED STATES PATENT AND TRADEMARK OFFICE
CERTIFICATE OF CORRECTION

PATENT NO. : 5,695,237

DATED : December 9, 1997

INVENTOR(S) : Brian L. Erickson, et. al.

It is certified that error appears in the above-identified patent and that said Letters Patent is hereby corrected as shown below:

Cover Page at [73];

"Pince" should be --Prince--.

Column 3, line 46;

"(64." should be --64.--.

Signed and Sealed this

Tenth Day of March, 1998

Attest:

BRUCE LEHMAN

Attesting Officer

Commissioner of Patents and Trademarks